UNITED STATES PATENT OFFICE.

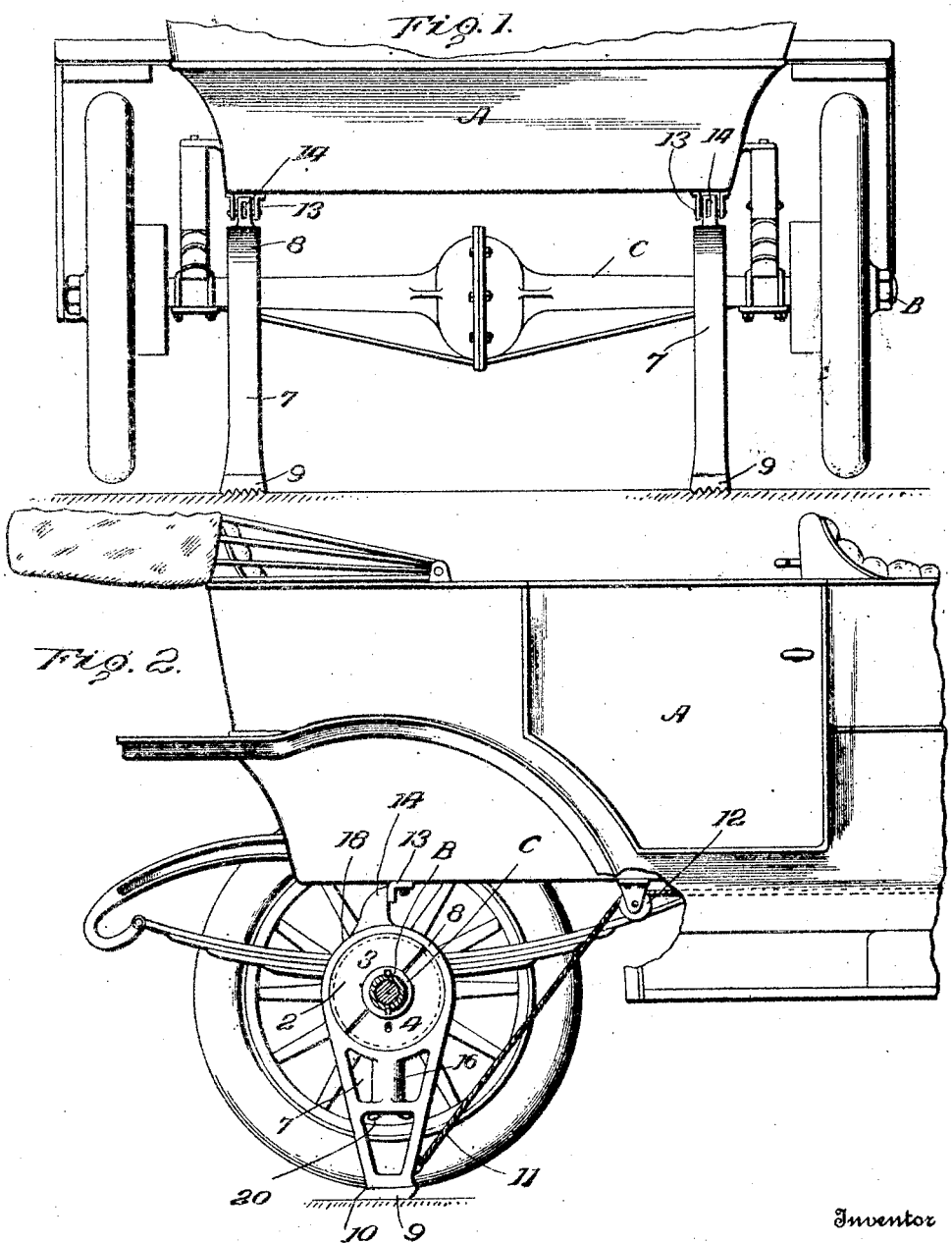

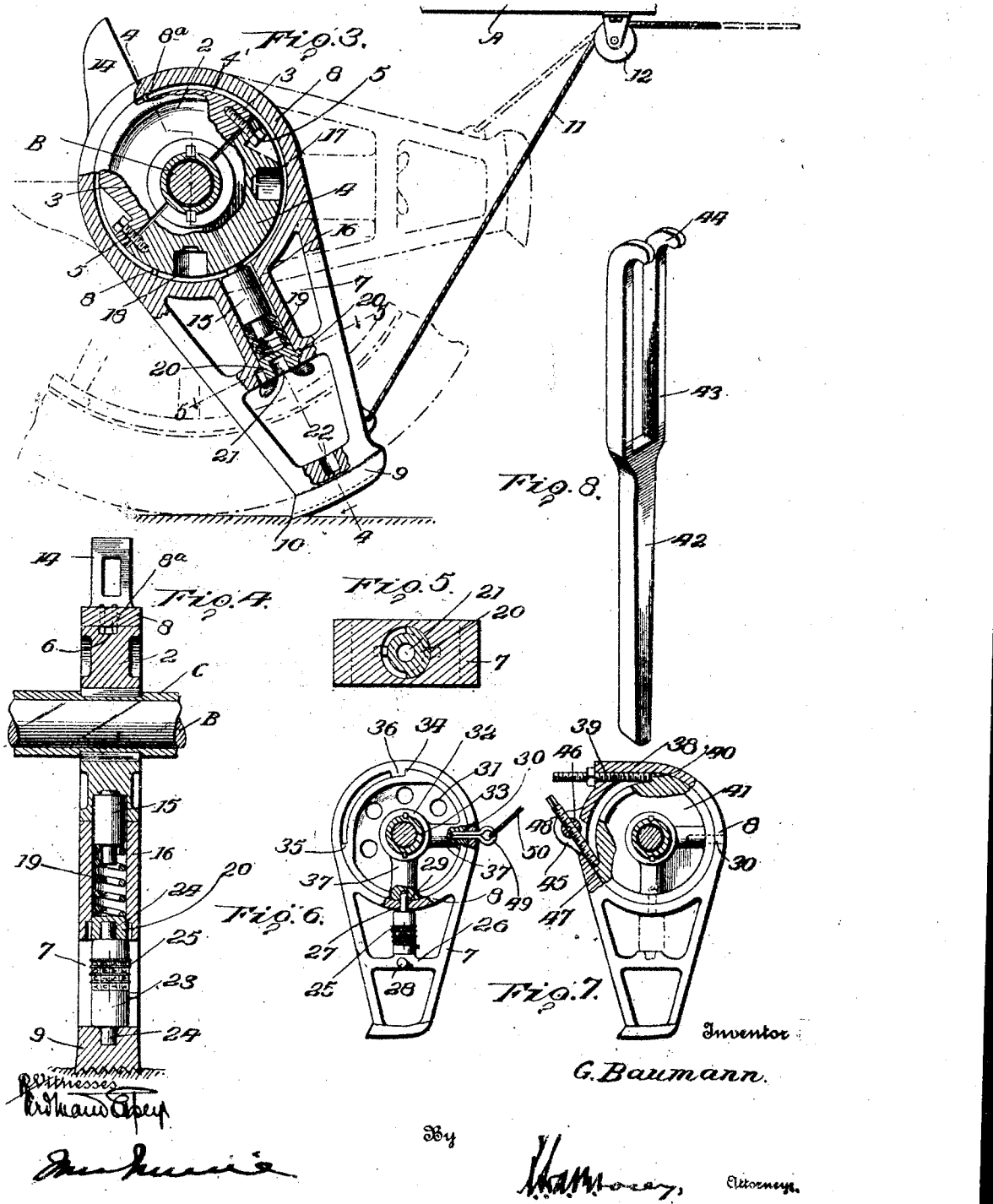

GOTTFRIED BAUMANN, OF HEATON MERSEY, ENGLAND.

COMBINED BRAKE, LOCK, AND JACK FOR AUTOMOBILES.

1,112,427.

Specification of Letters Patent.   Patented Oct. 6, 1914.

Application filed November 18, 1912. Serial No. 731,091.

*To all whom it may concern:*

Be it known that I, GOTTFRIED BAUMANN, subject of the King of Great Britain, residing at Rutli Villa, Mersey Road, Heaton Mersey, in the county of Lancaster, England, have invented certain new and useful Improvements in Combined Brakes, Locks, and Jacks for Automobiles, of which the following is a specification.

My invention relates to automobiles and particularly to an emergency braking device therefor.

The main object of the invention is the provision of an emergency braking apparatus mounted either in connection with the front or rear wheels of the car or in connection with both wheels, if desired, and so constructed that when thrown into operation the car will be lifted entirely from its wheels.

A further object is the provision of braking members pivotally mounted upon either the rear or front axle of the machine, normally held out of ground engaging position but adapted when released to drop into engagement with the ground and rotate to such a position as to lift the automobile wheels from the ground and leave the machine supported entirely by these members.

A further object is the provision of means whereby these members may be held in a raised or operative position or locked in their depressed position wherein they support the automobile wheels above the ground.

Other objects will appear in the course of the following description.

My invention is illustrated in the accompanying drawings, wherein—

Figure 1 is a rear end elevation of an automobile equipped with my improved braking and locking devices; Fig. 2 is a side elevation, partly in section, of the rear end of an automobile with my improved devices applied thereto; Fig. 3 is an enlarged and detail side elevation partly in section of the locking and braking device, parts of the mechanism being broken away to show the internal construction; Fig. 4 is a longitudinal section on the line 4—4 of Fig. 3, a locking member, however, being shown in position; Fig. 5 is a cross section on the line 5—5 of Fig. 3. Figs. 6 and 7 show side elevations of the modified forms of my invention; and Fig. 8 is a perspective view of a lever whereby the vehicle may be pushed forward to operate the supporting members.

Referring to the drawing and particularly to Figs. 1, 2, 3 and 4, A designates an automobile or like vehicle of any suitable description and constructed in any usual or suitable manner. B designates the rear axle of the vehicle and C the case surrounding the rear axle and housing it. Rotatably mounted upon the case C at the opposite end thereof and adjacent to the springs of the vehicle or in any other suitable position are brake members to be hereinafter specifically described. Preferably I provide a disk 2 for each of the brake members, which disk is preferably formed in two sections or halves 3 and 4 connected together by bolts 5, as shown in Fig. 3, and thereby clamped upon the cylindrical casing C. This disk is formed with a circumferential groove 6, as illustrated in Fig. 4. The braking or supporting member designated generally 7 is formed in any suitable manner, preferably as light as is consistent with strength, and the upper end of the member 7 is so constructed as to form a ring 8 which snugly surrounds the disk 2. The inner face of this annular portion 8 is formed with two pairs of pins 8ª which engage in the groove 4' in the periphery of the disk 2. It will be seen that the member 7 therefore has free rotary movement around the disk 2 but that it is prevented from lateral movement which would disengage it from the disk 2 by reason of the intermeshing action between the rib and the groove 4'. The member 7 has somewhat the form of a leg and narrows toward its lower end. At its lower end it is formed with a shoe 9 which extends somewhat beyond and rearward of the lower end of the leg and is formed with a sharp corner 10 and is designed to bite into the ground or roadway. This leg or supporting member 7 is preferably skeletonic in form. As illustrated in Fig. 2 the lower end of the leg or support 7 is attached to the end of a cord or like flexible connection 11 which passes upward and over the pulley 12 and then extends forward and is connected to any suitable actuating means whereby the leg may be lifted to a position parallel with the bottom of the chassis.

When this cord is released, the weight of the leg will draw it downward to such a position that the toe 10 of the shoe will engage the ground and the momentum of the vehicle will carry the leg to the position shown in Fig. 2. Inasmuch as the leg from its end to its center of rotation is longer than the radius of the wheel, it is obvious that the movement of the leg to the position shown in Fig. 2 will raise the vehicle so as to carry the wheels off the ground. A stop 13 is attached to the bottom of the vehicle or to the chassis in any suitable manner, and the annular portion 8 of the leg is provided with a lug 14 adapted to engage with this stop when the parts are brought to the position shown in Fig. 2, thus preventing any further rearward movement of the lower end of the leg and holding it in proper vertical position.

In the form of my invention as shown in Fig. 3 I provide means for latching the leg, if desired, in its horizontal position or latching the leg in its vertical position and for this purpose I provide a bolt 15 which is mounted in a bolt barrel 16, formed integral with the leg. This bolt 15 is adapted to engage in either one of the two recesses 17 and 18 formed in the disk 2 in quartering relation to each other and so disposed that the recess 18 is vertical while the recess 17 is horizontal and opens toward the front of the machine. The bolt 15 and its active end is so formed as to enter the groove 4 in the periphery of the disk 2 and thus form additional means for guiding the disk 2 with relation to the ring. A spring 19 disposed within the barrel acts to force the bolt 15 inward and the tension of this spring is controlled by means of a removable plug or head 20, having screw threaded or other engagement with the outer end of the barrel 16. Preferably this head 20 has a bayonet joint engagement with the end of the barrel 16 so that it may be held in place within the barrel by a half or quarter turn. When the head is removed from the barrel the spring or plunger will drop out. When, however, the head is in place the plunger or bolt 16 will be forced into engagement with the recesses 17 and 18. It will be understood that this device is only used for locking the leg or supporting member in a raised position or for locking the supporting member in a lowered position when it is to be used as a jack, or permanent support for the car. It will be noted that the head or plug 20 has a recess 21 in its under face and it will be also noted that the web forming the opposite end of the leg or suport is likewise formed with a recess 22. This is to provide means whereby a lock may be inserted to hold the bolt 15 in engagement with either the recess 17 or the recess 18. such a lock is illustrated in Fig. 4 as applied to the construction shown in Fig. 3, and inasmuch as this lock is fully described in my pending application for patent on bicycle locks, Serial No. 721,061, filed on the 18th day of Sept., 1912, it is not believed that any further description is necessary. This lock includes a barrel 23 having oppositely disposed pins or bolts 24 adapted to engage respectively with the recesses 21 and 22 and mounted upon the barrel of the lock are a plurality of rotatable tumblers 25 forming a combination lock, which when turned into a certain relative position will release the bolts or pins 24 and permit the lock to be removed, but which when turned into a certain other relative position will prevent the release of the pins 24 from their engagement with the recesses 21 and 22. It will be obvious then that when the lock is in place, the plug or head 20 cannot be removed from its engagement with the barrel 16 and that as a consequence the bolt 15 will be held firmly in engagement with the disk 2 preventing any rotation of the leg or supporting member with relation to the disk.

I do not wish to be limited to the disposal of the lock 25 as illustrated in Fig. 4, as the lock itself might be disposed between an intermediate web 26 and the annular portion 8 of the member 7, as illustrated in Fig. 6. This dispenses with the barrel 16, the spring pressed bolt 15 and related parts. The ring is perforated as at 27, the web 26 is also recessed and the lock 25 is inserted between the web 26 and the ring 8. One of the pins or bolts of the lock projects into a recess in web 26 while the other projects into and through the perforation 27 and engages one or the other of the recesses 29 or 30 formed in the rim of the disk 31. The web 26 is provided with a stud 28 adapted to be engaged by the lever shown in Fig. 8 for the purpose of manually forcing the legs into a supporting or vertical position.

In the form of my invention shown in Fig. 6, the disk 31 is illustrated as formed with a relatively thin web pierced at intervals so as to secure lightness, this web being formed with a central hub 32 which surrounds the casing 33 of the transmission shaft. In this form of my invention the disk 31 is formed with shoulders 34 and 35 which form stops limiting the arc of rotation of the leg or support 7, the ring 8 being provided with a lug 36 adapted to engage with either one of the shoulders 34 or 35. At a point coincident with the recesses 29 and 30 the disk is formed with enlarged portions 37 so as to strengthen the disk at this point. It is to be understood that the disk may be made skeletonic in form without departing in any way from the spirit of the invention. In place of forming the ring 8 with the lug 36 as shown in Fig. 6, I may form the ring 8 with a thickened tangential portion 38 through which a screw 39 may be inserted which engages with a shoulder 40 formed upon the disk 41, as shown in Fig. 7.

In Fig. 8 I show a lever whereby the vehicle may be easily pushed upon the jacks if necessary. This lever comprises a handle 42 having a bifurcated end 43, each member of the bifurcated end being angularly bent as at 44. This lever is intended to be used in conjunction with a leg having the oppositely disposed studs 28 with which the hooks 44 engage. Thus in order to force the machine forward upon the legs, the lever 15 is disposed with its hooks over the pins 28 and with the body of the lever bearing against the housing 33. The upper end of the lever is then forced forward, the housing acting as a fulcrum thus forcing the body of the vehicle forward and the leg into a vertical position. A reverse manner of using the lever will act to force the legs into a horizontal position. Preferably, however, I provide the means illustrated in Fig. 7 for forcing the legs or supporting members either into a horizontal or a vertical position. To this end, I form the ring 8 at its rear with a slotted protuberance 45, and dispose in this protuberance a rotatable member 46 interiorly screw threaded. Passing through this interior screw thread and into engagement with a stop 47 formed on the disk 41 is a screw 48. The screw 39 previously described not only performs the function of a stop screw, but is also long enough so that it may be turned up and thereby rotate the ring 8 in one direction, while the screw 48 will rotate the ring 8 in an opposite direction. Normally, of course, the screw 38 will be so adjusted that it will act as a stop. When, however, it is desired to manually force the leg or support downward into a vertical position to thereby jack up the vehicle, the screw 48 is turned. This bearing as it does against the abutment 47 or shoulder, will cause the leg to be rotated from a position such as shown in Fig. 3 to a position such as shown in Fig. 2. A rotation of the screw 39 will act in a reverse manner to rotate the leg from the position shown in Fig. 2 to that in Fig. 3 and also the car onto its wheels. The screw 48 is an emergency screw and is of course not intended to normally pass through the screw threaded opening in the rotatable member 46. Otherwise it would prevent the rotation of the ring 8 upon the disk 41.

In Fig. 6 I show a means for holding the leg 7 in a horizontal position or locking it in a vertical position. This comprises the cotter pin 49 which passes through the opening in the outer ring and into the opening 30 of the disk 31. This pin 49 is connected to a cord 50 which runs up in convenient position to the driver's hand. If it is desired to use the emergency brake, the cord 50 is pulled, pulling out the pin and permitting the legs to drop as previously described. When the pin is inserted as in Fig. 6, it assists in locking the leg 7 in a vertical position.

The operation of my invention is the same for all the various forms shown. The bracing or supporting members or legs 7 are held raised, that is, in the position shown by dotted lines in Fig. 3. When it is desired to use the emergency brake the flexible connection 11 is loosened or the pin 49 pulled out whereupon the legs or supports will fall to the position shown in Fig. 3 and the momentum of the vehicle will carry the legs downward to the position shown in Fig. 2, lifting the vehicle entirely off the wheels with which the legs or supporting members co-act, this will act to stop the forward movement of the vehicle almost immediately.

It is obvious that my device acts as a jack when desired, whereby the body of the vehicle may be raised so as to lift the wheels off the ground and this can be readily secured by allowing the supporting members to drop to the position shown in full lines in Fig. 3 and then shifting the body forward by means of the lever shown in Fig. 8 or by means of the screw 48. The supporting members may be locked in their horizontal position, if desired, or they may be locked in their vertical position, and in this latter case the vehicle cannot be moved unless the combination of lock 23 is understood. This will prevent unauthorized use of the vehicle and will also prevent the vehicle from being stolen.

I do not wish to be limited to the use of a combination or permutation lock for the supporting legs, as it is obvious that other locking means may be used.

My invention is simple, effective and may be readily applied to automobiles at present in use.

Having thus described my invention what is claimed is:

1. The combination with a wheeled vehicle, of disks rotatably mounted upon the vehicle, supporting members, one for each disk, each supporting member having an annular portion rotatably engaging the disk and being rotatable upon the disk in a plane parallel to the length of the vehicle, each disk having a recess upon its edge face, the supporting member having a transversely extending web disposed approximately parallel to the annular portion of the supporting member, and a locking means carried by said web and the annular portion of the supporting member and including a bolt adapted to project through the annular portion and into a recess in said disk.

2. The combination with a wheeled vehicle, of a supporting member rotatably attached to the body of the vehicle for movement in a plane parallel to the length of the vehicle, said member when disposed in a vertical position extending below the periphery of the adjacent vehicle wheel, a barrel carried by the supporting member, a bolt in the barrel adapted to latch the supporting member in a vertical or horizontal position, a spring for each bolt acting to force it into its locked position, a removable head bearing against the outer end of the spring, and a locking device removably disposed at the lower end of the supporting member and acting to lock said removable head in place whereby to prevent a removal of the head and a consequent removal of the spring.

3. The combination with a wheeled vehicle, of a supporting member rotatably attached to the body of the vehicle for movement in a plane parallel to the length of the vehicle, said member when disposed in a vertical position extending below the peripheries of the wheels, a spring pressed bolt carried by the supporting member and acting to latch the supporting member in a horizontal or a vertical position, and a lock engageable with the said bolt to hold it in its latching position.

4. The combination with a wheeled vehicle, of supporting members rotatably attached to the body of the vehicle for movement in planes parallel to the length of the vehicle, said members when disposed in a vertical position extending below the peripheries of the vehicle wheels, and a spring pressed bolt carried by each of the supporting members and acting to latch the supporting members in a horizontal or a vertical position.

5. The combination with a wheeled vehicle, of supporting members rotatably attached to the body of the vehicle for movement in planes parallel to the length thereof, said members when disposed in a vertical position extending below the peripheries of the vehicle wheels, a barrel carried by each of the supporting members and a bolt in each barrel acting to latch the supporting members in a horizontal or a vertical position, a spring for each bolt acting to force it into its locking position, and a removable head in each barrel bearing against the outer end of the spring.

6. The combination with a wheeled vehicle, of supporting members rotatably attached to the body of the vehicle for movement in planes parallel to the length thereof, said members when disposed in a vertical position extending below the peripheries of the vehicle wheels, each of said members being formed with a bore extending radially to the axis of said member, a bolt disposed in said bore, a spring disposed in the bore and engaging the bolt, and a head detachably engaging the end of the bore and when in place bearing against the outer end of the spring, said head being removable to permit the removal of the spring.

7. The combination with a wheeled vehicle, of disks rotatably mounted upon the vehicle, supporting members one for each disk, each supporting member having an annular portion rotatably engaging the disk and being rotatable upon the disk in a plane parallel to the length of vehicle, each supporting member being greater in length from its end than the radius of the adjacent vehicle wheel, each disk having a recess upon its edge face, and a latching member mounted upon the annular portion of each supporting member and engageable in the recess of the corresponding disk.

8. The combination with a vehicle, a driving axle, and a casing surrounding the driving axle, of oppositely disposed disks rigidly mounted on said casing, supporting members each having an annular portion at its upper end surrounding the corresponding disk, the lower end of each supporting member being tapered and formed with a shoe, said disk being formed with bolt-receiving recesses, and means carried by each of the supporting members and engageable with said recesses to hold the supporting member either in a vertical or a horizontal position.

In testimony whereof I affix my signature in presence of two witnesses.

GOTTFRIED BAUMANN. [L. S.]

Witnesses:
   LEONARD F. FARRELL,
   FRANCIS N. CHANDLER.